United States Patent
Iida et al.

(10) Patent No.: US 10,885,355 B2
(45) Date of Patent: Jan. 5, 2021

(54) OBJECT DETECTION DEVICE AND OBJECT DETECTION METHOD

(71) Applicant: Mitsubishi Electric Corporation, Tokyo (JP)

(72) Inventors: Koji Iida, Tokyo (JP); Noritaka Kokido, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 62 days.

(21) Appl. No.: 16/342,057

(22) PCT Filed: Nov. 8, 2016

(86) PCT No.: PCT/JP2016/083120
§ 371 (c)(1),
(2) Date: Apr. 15, 2019

(87) PCT Pub. No.: WO2018/087817
PCT Pub. Date: May 17, 2018

(65) Prior Publication Data
US 2019/0258877 A1    Aug. 22, 2019

(51) Int. Cl.
*G06K 9/00* (2006.01)
*G01V 8/12* (2006.01)
*G06K 9/62* (2006.01)

(52) U.S. Cl.
CPC .......... *G06K 9/00805* (2013.01); *G01V 8/12* (2013.01); *G06K 9/6262* (2013.01)

(58) Field of Classification Search
CPC ............. G06K 9/00805; G06K 9/6262; G06K 9/6265; G01V 8/12
See application file for complete search history.

(56) References Cited

U.S. PATENT DOCUMENTS

| 9,582,886 B2 * | 2/2017 | Sasabuchi | G06K 9/00369 |
| 2009/0118994 A1 * | 5/2009 | Mori | G06K 9/00798 701/117 |
| 2015/0109336 A1 * | 4/2015 | Hayakawa | G06K 9/6217 345/633 |

FOREIGN PATENT DOCUMENTS

| JP | 2013-104689 A | 5/2013 |
| WO | 2011/108258 A1 | 9/2011 |
| WO | 2016/035243 A1 | 3/2016 |

OTHER PUBLICATIONS

IP.com search report.*
International Search Report for PCT/JP2016/083120 dated Jan. 31, 2017 (PCT/ISA/210).

* cited by examiner

*Primary Examiner* — Asghar H Bilgrami
(74) *Attorney, Agent, or Firm* — Sughrue Mion, PLLC; Richard C. Turner (57) ABSTRACT

Provided is an object detection device including: a detection unit configured to detect objects for every detection period to output detection information containing a reliability for each of the detected objects; a determination unit configured to: increment a detection count for each of the objects; calculate, for each of the objects, a sum of latest N reliabilities in the detection period; and determine, as a normally recognized object, an object for which the sum is equal to or larger than a first threshold value, which is set in advance depending on the detection count; and a control unit configured to output, as normally detected object information, detection information on the normally recognized object.

8 Claims, 4 Drawing Sheets

OBJECT DETECTION DEVICE AND OBJECT DETECTION METHOD

CROSS REFERENCE TO RELATED APPLICATIONS

This application is a National Stage of International Application No. PCT/JP2016/083120 filed Nov. 8, 2016.

TECHNICAL FIELD

The present invention relates to an object detection device and method for detecting an object by an automatic driving vehicle, for example.

BACKGROUND ART

There has been developed a device (refer to Patent Literature 1, for example) configured to detect an obstacle around a vehicle to support collision avoidance by various kinds of sensors mounted in the vehicle. The object detection device in Patent Literature 1 photographs a situation around a vehicle by a camera installed in the vehicle, for example, and detects an obstacle such as a pedestrian or a nearby vehicle based on the photographed image. Then, when the object detection device determines that a driver on the vehicle is in danger based on the detected obstacle, the object detection device issues a warning to the driver, to thereby support danger avoidance.

CITATION LIST

Patent Literature

[PTL 1] JP 2013-104689 A

SUMMARY OF INVENTION

Technical Problem

However, the related art has the following problem.

Specifically, the object detection device in Patent Literature 1 has problem of erroneously detecting an obstacle around a vehicle. Occurrence of such erroneous detection causes significant deterioration in reliability of the object detection device.

The present invention has been made to solve the above-mentioned problem, and has an object to provide an object detection device and an object detection method, which are capable of suppressing erroneous detection of an obstacle around a vehicle, in particular, to improve the reliability of performance of detecting the obstacle around the vehicle.

Solution to Problem

According to one embodiment of the present invention, there is provided an object detection device including: a detection unit configured to detect one or more objects for every detection period to output detection information containing a reliability for each of the detected one or more objects; a determination unit configured to: increment a detection count for each of the one or more objects; calculate, for each of the one or more objects, a sum of latest N reliabilities in the detection period, which are contained in the detection information; and determine, as a normally recognized object, an object for which the sum is equal to or larger than a first threshold value, which is set in advance depending on the detection count; and a control unit configured to output, as normal detected object information, detection information on an object determined to be the normally recognized object by the determination unit among objects contained in the detection information.

Further, according to another embodiment of the present invention, there is provided an object detection method including: a first step of acquiring detection information containing a reliability for each object serving as a detection target for every detection period via a detector configured to output the detection information; a second step of: incrementing a detection count for each object; calculating, for each object, a sum of latest N reliabilities in the detection period, which are contained in the detection information; and determining, as a normally recognized object, an object for which the sum is equal to or larger than a first threshold value, which is set in advance depending on the detection count; and a third step of outputting, as normally detected object information, detection information on an object determined to be the normally recognized object in the first step among objects contained in the detection information.

Advantageous Effects of Invention

According to the embodiments of the present invention, there is provided a configuration capable of executing object recognition processing accurately and equally without depending on a detection count of an object acquired by the detection unit through use of a combination of the detection count and a determination value by appropriately setting the determination value that depends on the detection count of the object, in the determination of whether detection information on the object indicates normal recognition or erroneous recognition. As a result, it is possible to provide the object detection device and the object detection method, which are capable of suppressing erroneous detection of an obstacle around a vehicle, in particular, to improve the reliability of performance of detecting the obstacle around the vehicle.

DESCRIPTION OF EMBODIMENTS

A description is now given of an object detection device and an object detection method according to preferred embodiments of the present invention with reference to the accompanying drawings.

First Embodiment

An object detection device and an object detection method according to a first embodiment of the present invention have a technical feature of including a configuration and processing for determining erroneous recognition in a case where a detection count of an obstacle is equal to or larger than a count N determined in advance.

Figure 1:
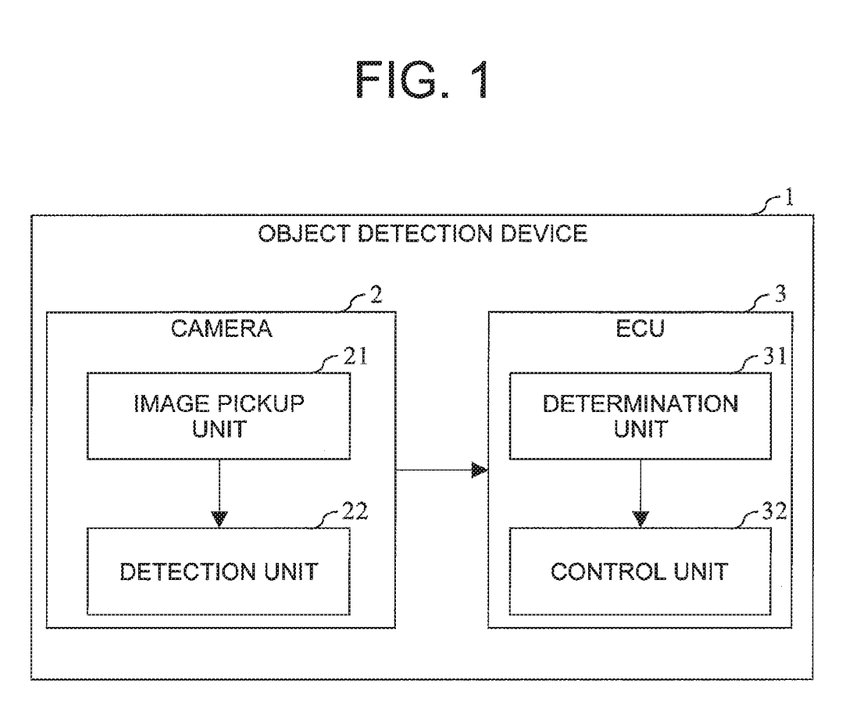
FIG. 1 is a block diagram for illustrating an object detection device according to first to third embodiments of the present invention.
Figure 2:
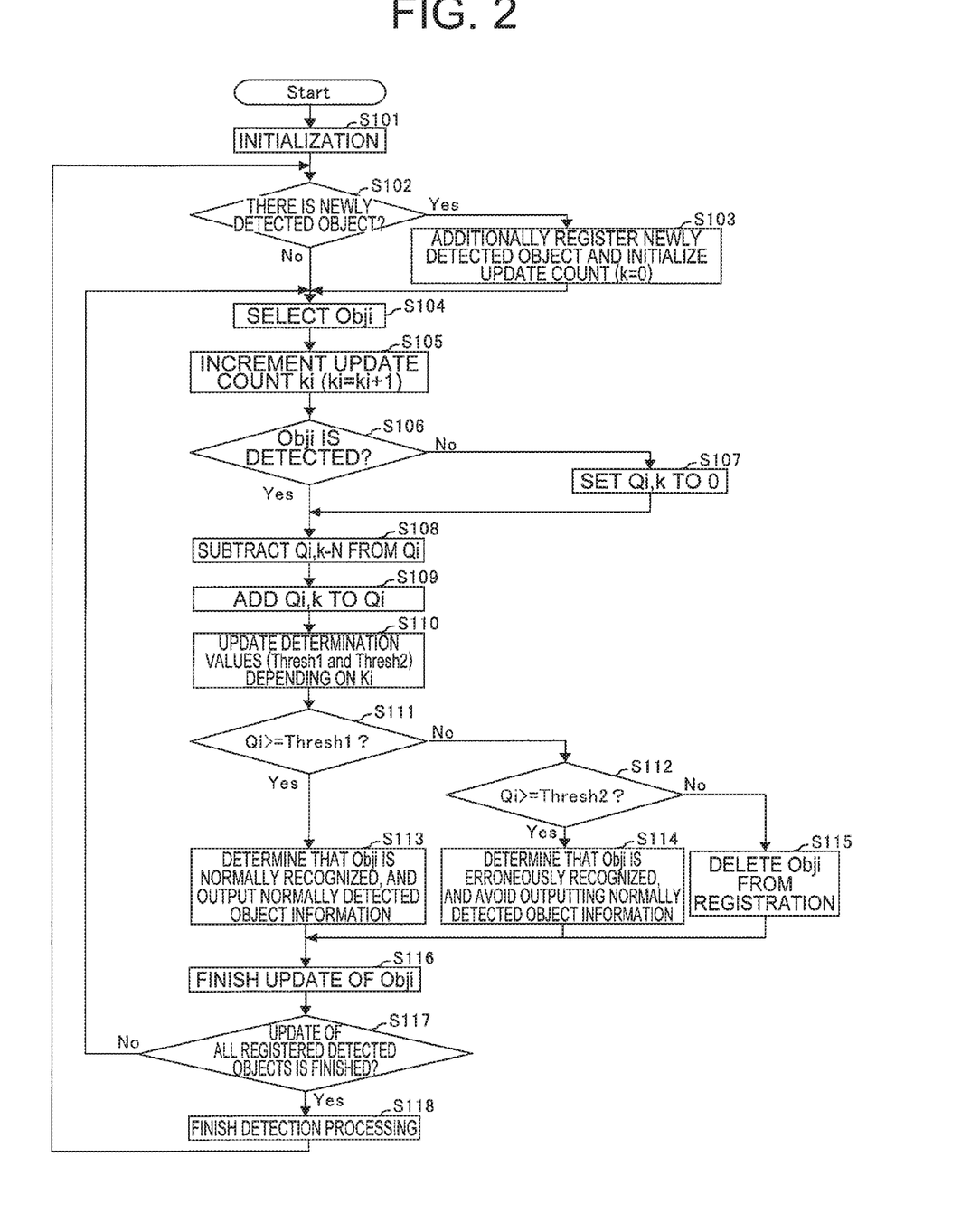
FIG. 2 is a flowchart for illustrating a series of processing steps to be executed by the object detection device according to the first embodiment of the present invention.

FIG. 1 is a block diagram for illustrating the object detection device according to the first embodiment of the present invention. Further, FIG. 2 is a flowchart for illustrating a series of processing steps to be executed by the object detection device according to the first embodiment of the present invention. In the following, processing in the first embodiment is described in detail with reference to FIG. 1 and FIG. 2.

<Description of Block Diagram>

An object detection device 1 illustrated in FIG. 1 is included in, for example, a vehicle, and includes a camera 2 configured to photograph a situation around the vehicle, and an ECU 3.

The camera 2 is a sensor configured to photograph a situation around the vehicle, and detect an obstacle around the vehicle based on the image. As a specific hardware configuration, this camera 2 includes: an image pickup element configured to convert an optical image of a subject, which has been obtained through a lens, into an electronic signal, and a CPU configured to perform various kinds of arithmetic processing and information processing; a RAM being a volatile storage serving as a work area of the CPU; and a memory being a non-volatile storage.

As illustrated in FIG. 1, the camera 2 having such a hardware configuration includes respective blocks of an image pickup unit 21 and a detection unit 22. The image pickup unit 21 is configured to photograph a situation around the vehicle to acquire an image of the situation around the vehicle. Meanwhile, the detection unit 22 is configured to perform image recognition processing on the image acquired by the image pickup unit 21 to extract a desired obstacle. Specifically, the detection unit 22 can output, as detection information indicating characteristics of the extracted obstacle, the position of the obstacle, the type of result of detecting the obstacle, the ID of the obstacle, and the reliability of the detection result, for example.

As the reliability, for example, a recognition rate of image processing can be adopted, or the recognition rate can be classified into a plurality of ranges for ranking and a rank that depends on the recognition rate can be adopted.

The ECU 3 has a configuration similar to that of a general computer, and includes: a CPU configured to perform various kinds of arithmetic processing and information processing; a RAM being a volatile storage serving as a work area of the CPU; and a memory being a non-volatile storage. This memory stores a program for executing a series of processing steps in the present invention.

As illustrated in FIG. 1, the ECU 3 having such a hardware configuration includes respective blocks of a determination unit 31 and a control unit 32. The determination unit 31 is configured to determine, based on detection information on an obstacle acquired from the detection unit 22 of the camera 2, whether the obstacle is erroneously recognized. Meanwhile, the control unit 32 is configured to control output normally detected object information by using a result acquired by the determination unit 31.

The object detection device 1 having such a configuration is configured to execute a series of procedures of the processing of detecting an obstacle around the vehicle, which has incorporated new processing in the present invention. FIG. 2 is a flowchart for illustrating a series of procedures of the processing of detecting an obstacle around the vehicle to be executed by the object detection device 1 according to the first embodiment of the present invention.

The procedures of the processing of FIG. 2 are programmed in advance, and are stored in the memory of the ECU 3, for example.

<Description of Flowchart>

Next, a description is given in detail of the flowchart of FIG. 2. Each reference symbol used in FIG. 2 and the following description represents the following meaning.

$Obj_i$: i-th detected object $k_i$: Update count from initial detection of $Obj_i$ $Q_i$: Reliability of $Obj_i$ $Q_{i,k}$: Reliability of $Obj_i$ at $k_i$-th update $Thresh1_i$: Determination value for determining whether to output $Obj_i$ $Thresh2_i$: Determination value for determining whether to maintain registration of or delete $Obj_i$, which is a value smaller than $Thresh1_i$ First, in Step S101, the ECU 3 performs initial processing determined in advance. After that, in Step S102, the ECU 3 receives detection information, which has been obtained from the image, from the camera 2, and determines whether there is a newly detected object.

That is, the ECU 3 determines whether the object contained in the detection information acquired from the camera 2 is registered in the RAM. When it is determined that there is a newly detected object (Step S102: Yes), the ECU 3 proceeds to Step S103, whereas when it is determined that there is no newly detected object (Step S102: No), the ECU 3 proceeds to Step S104.

When the ECU 3 proceeds to Step S103, the ECU 3 registers information on a newly detected object $Obj_{new}$ in the RAM, and performs initialization by setting an update count knew to $k_{new}=0$, and a reliability $Q_{new}$ to $Q_{new}=0$. After that, the ECU 3 proceeds to Step S104.

In Step S104 to Step S116, the ECU 3 selects one object from among detected objects registered in the RAM, and performs processing of determining erroneous recognition.

In Step S104, the ECU 3 selects one detected object for which update processing is not performed from among the detected objects registered in the RAM. The ECU 3 sets this object as $Obj_i$. After that, the ECU 3 proceeds to Step S105.

Next, in Step S105, the ECU 3 increments ($k_i=k_i+1$) the value of $k_i$ representing a detection update count from initial detection for the selected object $Obj_i$, and proceeds to Step S106.

Next, in Step S106, the ECU 3 determines whether the detected object corresponding to $Obj_i$ is contained in the detection information received from the detection unit 22 of the camera 2. When it is determined that the detected object corresponding to $Obj_i$ is contained in the detection information (Step S106: Yes), the ECU 3 proceeds to Step S108, whereas when it is determined that the detected object corresponding to $Obj_i$ is not contained in the detection information (Step S106: No), the ECU 3 proceeds to Step S107.

After the ECU 3 proceeds to Step S107, the ECU 3 sets the reliability $Q_{i,k}$ of $Obj_i$ at the $k_i$-th update to 0, and proceeds to Step S108.

In Step S108, in order to calculate the sum of latest N reliabilities, the ECU 3 subtracts, from $Q_i$ representing the reliability of $Obj_i$, the ($k_i$-N)-th reliability of $Obj_i$, namely, $Q_{i,k-N}$ being the oldest reliability among current N reliabilities.

Next, in Step S109, the ECU 3 adds the $k_i$-th reliability of $Obj_i$ to the value of the reliability $Q_i$ before update to calculate the sum of N reliabilities of from the ($k_i$-N+1)-th reliability to the current $k_i$-th reliability, and proceeds to Step S110. With the processing of Step S108 and Step S109, the latest N values can be added to obtain the reliability $Q_i$ of $Obj_i$.

Next, in Step S110, the ECU 3 updates a determination value Thresh1 and a determination value Thresh2 in accordance with the update count $k_i$ from initial detection of $Obj_i$, and proceeds to Step S111.

As one example, the ECU 3 can set a value that becomes larger as the update count becomes smaller as the determination value in advance, and set a value that becomes smaller as the update count becomes larger as the determination value. In this setting, as the detection count corresponding to the update count becomes larger, it can be determined more reliably that the recognition is not erroneous. Thus, in such a case, identification of whether the recognition is normal or erroneous can be accurately performed even when the determination value is set to be smaller.

Meanwhile, when the detection count is small, a larger set determination value can be used to reliably prevent erroneous determination of normal recognition although the recognition is erroneous in actuality. In short, the present invention can set the determination value that depends on the detection count appropriately, and identify whether the recognition is normal or erroneous by a combination of the detection count and the determination value, to thereby execute object recognition processing accurately and equally without depending on the detection count.

Next, in Step S111, the ECU 3 compares the reliability $Q_i$ of $Obj_i$ with the determination value Thresh1 to determine whether $k_i$-th detection is normal. When $Q_i$>=Thresh1 is determined (Step S111: Yes), the ECU 3 proceeds to Step S113. On the contrary, when Q<Thresh1 is determined (Step S111: No), the ECU 3 proceeds to Step S112.

When the ECU 3 proceeds to Step S112, the ECU 3 compares the reliability $Q_i$ of $Obj_i$ with the determination value Thresh2 to determine whether to maintain registration of or delete $Obj_i$ registered in the RAM. When. $Q_i$>=Thresh2 is determined (Step S112: Yes), the ECU 3 proceeds to Step S114. On the contrary, when $Q_i$<Thresh2 is determined (Step S112: No), the ECU 3 proceeds to Step S115.

When the ECU 3 proceeds to Step S113, it is determined that the reliability is sufficiently high. Thus, the ECU 3 determines that $Obj_i$ is normally detected, outputs this determination as the normally detected object information, and proceeds to Step S116.

When the ECU 3 proceeds to Step S114, it is determined that the reliability is not sufficiently high. Thus, the ECU 3 does not output the normally detected object information. However, the ECU 3 does not delete $Obj_i$ from detection registration information, and maintains the information in the RAM. After that, the ECU 3 proceeds to Step S116.

When the ECU 3 proceeds to Step S115, it is determined that the reliability is extremely low. Thus, the ECU 3 does not output the normally detected object information. Further, the ECU 3 deletes $Obj_i$ from the RAM to delete the registration. After that, the ECU 3 proceeds to Step S116.

Then, in Step S116, the ECU 3 sets a flag indicating completion of the processing of updating $Obj_i$, and proceeds to Step S117.

Next, in Step S117, the ECU 3 determines whether the processing of updating all the detected objects registered in the RAM is finished. When it is determined that the processing of updating all the detected objects is finished (Step S117: Yes), the ECU 3 proceeds to Step S118.

On the contrary, when it is determined that there is a detected object for which the updating processing is not finished (Step S117: No), the ECU 3 returns to Step S104, and the ECU 3 performs processing similar to the processing of from. Step S104 for the detected object for which the updating processing is not finished.

Finally, the ECU 3 proceeds to Step S118, and then erroneous recognition determination processing for one detection cycle by the detection unit 22 of the camera 2 is finished, and the ECU 3 returns to Step S102. Then, the ECU 3 waits at Step S102 until reception of next detection information from the camera 2. This concludes the description of the series of processing steps of FIG. 2.

Next, a description is given of the technical significance of the first embodiment of the present invention involving such a series of processing steps illustrated in FIG. 2. With the processing procedure illustrated in FIG. 2, the ECU 3 can reduce the risk of erroneous recognition of determining that an object is an obstacle although the object should not have been detected as the obstacle in actuality. The detection result obtained through erroneous recognition is usually output as a value having a small reliability $Q_{i,k}$.

Regarding the detection result obtained through erroneous recognition and having a small reliability, the reliability value $Q_{i,k}$ of one such detection result can be compared with the determination value (Thresh1) to determine erroneous recognition. However, some detection results having a large reliability value may be accidentally output from the detection unit 22 with low frequency although the object corresponding to the detection result should not have been detected.

Regarding such erroneous recognition of a detection result having a large reliability value, it is not easy to determine the detection result as erroneous recognition by simply comparing the reliability $Q_{i,k}$ of the above-mentioned one detection result with the determination value. It is possible to determine erroneous recognition by setting the determination value larger. However, this may cause erroneous determination that there is no obstacle although an obstacle should have been normally detected in actuality, resulting in a risk of a failure to detect the obstacle.

In order to avoid such a problem, in the first embodiment, normal recognition and erroneous recognition are distinguished from each other by considering the results of a plurality of times of detection. Specifically, the technique in the first embodiment uses the reliability $Q_i$, which is a sum of the latest plurality of reliabilities $Q_{i,k}$, to distinguish between erroneous recognition/normal recognition for the detection result. Thus, even when only one of the plurality of reliabilities has an accidentally large value, other reliabilities are small, with the result that the sum $Q_i$ of the plurality of reliabilities has a small value. Therefore, it is possible to correctly determine erroneous recognition by adopting the technique in the first embodiment even when the reliability has an accidentally large value.

Similarly to the case of the detection result of erroneous recognition, the technique in the first embodiment can be applied to the detection result of normal recognition. Specifically, even when a detection result of normal recognition having an accidentally small reliability $Q_{i,k}$ is obtained, the value of the reliability $Q_i$, which is the sum of the latest plurality of reliabilities $Q_{i,k}$, has a large value. Therefore, it is possible to correctly determine normal recognition by adopting the technique in the first embodiment even when the reliability has an accidentally small value.

Second Embodiment

In the first embodiment, a description has been given of the configuration and processing for determining erroneous recognition in a case where the detection count of an obstacle is equal to or larger than the count N determined in advance. In contrast, in a second embodiment of the present invention, a description is given of a configuration and processing for determining erroneous recognition in a case where the detection count of an obstacle from initial detection s smaller than the count N.

Figure 3:
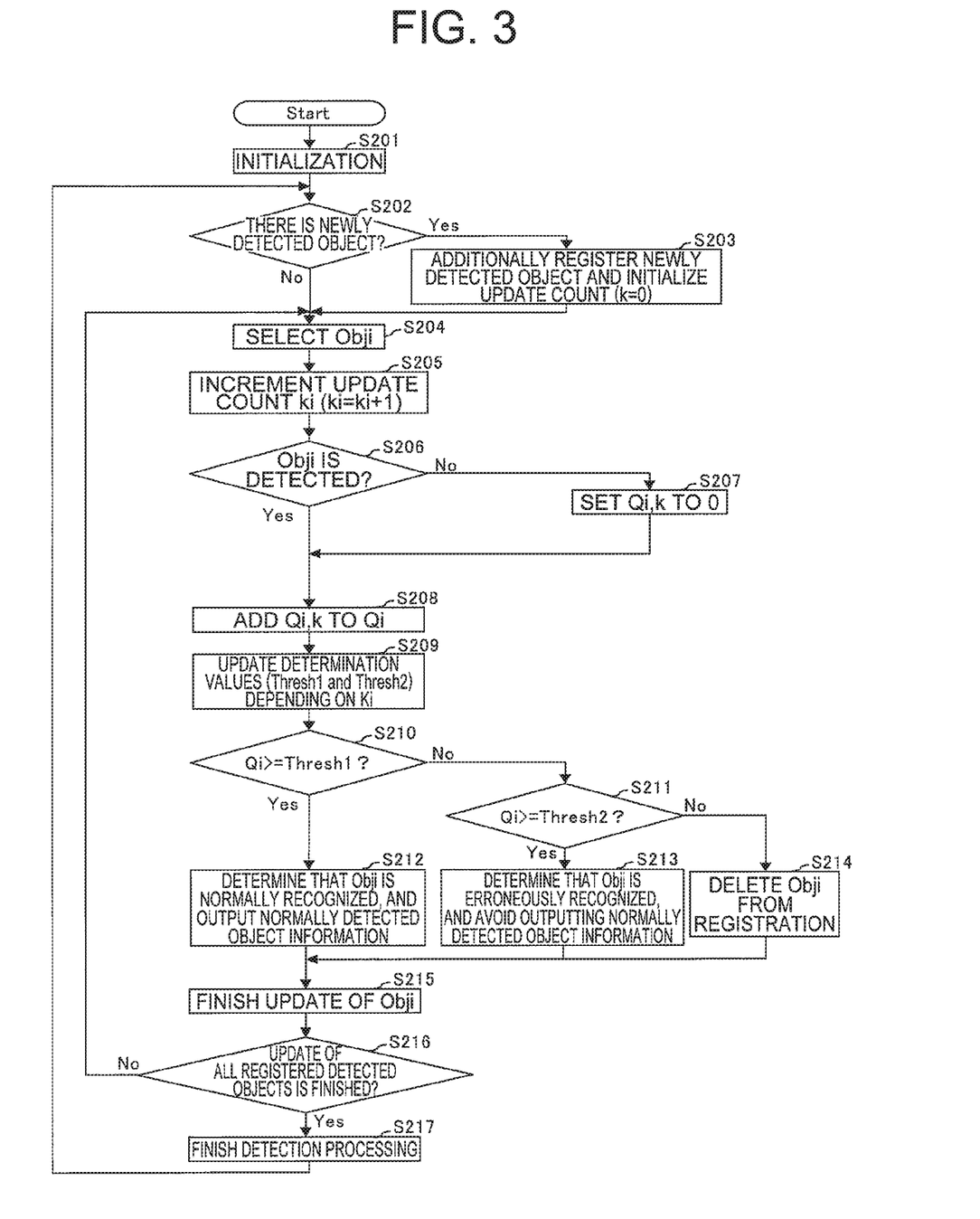
FIG. 3 is a flowchart for illustrating a series of processing steps to be executed by the object detection device according the second embodiment of the present invention.

The block diagram is the same as that of FIG. 1. Further, FIG. 3 is a flowchart for illustrating a series of processing steps to be executed by an object detection device according to the second embodiment of the present invention. Thus, in the following, the description of the block diagram of FIG. 1 is omitted, and FIG. 3 is used to describe the processing of the second embodiment in detail.

<Description of Flowchart>

Now, a description is given in detail of the flowchart of FIG. 3. Each reference symbol used in FIG. 3 and the following description represents the same meaning as that in the first embodiment.

First, in Step S201, the ECU 3 performs initial processing determined in advance. After that, in Step S202, the ECU 3 receives detection information, which has been obtained from the image, from the camera 2, and determines whether there is a newly detected object.

That is, the ECU 3 determines whether the object contained in the detection information acquired from the camera 2 is registered in the RAM. When it is determined that there is a newly detected object (Step S202: Yes), the ECU 3 proceeds to Step S203, whereas when it is determined that there is no newly detected object (Step S202: No), the ECU 3 proceeds to Step S204.

When the ECU 3 proceeds to Step S203, the ECU 3 registers information on a newly detected object $Obj_{new}$ the RAM, and performs initialization by setting an update count $k_{new}$ to $k_{new}=0$, and a reliability $Q_{new}$ to $Q_{new}=0$. After that, the ECU 3 proceeds to Step S204.

In Step S204 to Step S215, the ECU 3 selects one object from among detected objects registered in the RAM, and performs processing of determining erroneous recognition.

In Step S204, the ECU 3 selects one detected object for which update processing is not performed from among the detected objects registered in the RAM. The ECU 3 sets this object as $Obj_i$. After that, the ECU 3 proceeds to Step S205.

Next, in Step S205, the ECU 3 increments ($k_i=k_i+1$) the value of $k_i$ representing a detection update count from initial detection for the selected object $Obj_i$, and proceeds to Step S206.

Next, in Step S206, the ECU 3 determines whether the detected object corresponding to $Obj_i$ is contained in the detection information received from the detection unit 22 of the camera 2. When it is determined that the detected object corresponding to $Obj_i$ is contained in the detection information (Step S206: Yes), the ECU 3 proceeds to Step S208, whereas when it is determined that the detected object corresponding to $Obj_i$ is not contained in the detection information (Step S206: No), the ECU 3 proceeds to Step S207.

After the ECU 3 proceeds to Step S207, the ECU 3 sets the reliability $Q_{i,k}$ of $Obj_i$ at the $k_i$-th update to 0, and proceeds to Step S208.

In Step S208, the ECU 3 adds the $k_i$-th reliability of $Obj_i$ to the value of the reliability $Q_i$ before update, and proceeds to Step S209. With such addition processing, the accumulated value of from the first to $k_i$-th reliabilities in a case where the detection count is smaller than the count N can be calculated as the reliability $Q_i$ of the $Obj_i$.

Next, in Step S209, the ECU 3 updates a determination value Thresh1 and a determination value Thresh2 in accordance with the update count $k_i$ from initial detection $Obj_i$, and proceeds to Step S210.

Next, in Step S210, the ECU 3 compares the reliability $Q_i$ of $Obj_i$ with the determination value Thresh1 to determine whether $k_i$-th detection is normal. When $Q_i>=$Thresh1 is determined (Step S210: Yes), the ECU 3 proceeds to Step S212. On the contrary, when Q<Thresh1 is determined (Step S210: No), the ECU 3 proceeds to Step S211.

When the ECU 3 proceeds to Step S211, the ECU 3 compares the reliability $Q_i$ of $Obj_i$ with the determination value Thresh2 to determine whether to maintain registration of or delete $Obj_i$ registered in the RAM. When $Q_i>=$Thresh2 is determined (Step S211: Yes), the ECU 3 proceeds to Step S213. On the contrary, when $Q_i<$Thresh2 is determined (Step S211: No), the ECU 3 proceeds to Step S214.

When the ECU 3 proceeds to Step S212, it is determined that the reliability is sufficiently high. Thus, the ECU 3 determines that $Obj_i$ is normally detected, outputs this determination as the normally detected object information, and proceeds to Step S215.

When the ECU 3 proceeds to Step S213, it is determined that the reliability is not sufficiently high. Thus, the ECU 3 does not output the normally detected object information. However, the ECU 3 does not delete $Obj_i$ from detection registration information, and maintains the information in the RAM. After that, the ECU 3 proceeds to Step S215.

When the ECU 3 proceeds to Step S214, it determined that the reliability is extremely low. Thus, the ECU 3 does not output the normally detected object information. Further, the ECU 3 deletes $Obj_i$ from the RAM to delete the registration. After that, the ECU 3 proceeds to Step S215.

Then, in Step S215, the ECU 3 sets a flag indicating completion of the processing of updating $Obj_i$, and proceeds to Step S216.

Next, in Step S216, the ECU 3 determines whether the processing of updating all the detected objects registered in the RAM is finished. When it is determined that the processing of updating all the detected objects is finished (Step S216: Yes), the ECU 3 proceeds to Step S217.

On the contrary, when it is determined that there is a detected object for which the updating processing is not finished (Step S216: No), the ECU 3 returns to Step S204, and the ECU 3 performs processing similar to the processing of from Step S104 for the detected object for which the updating processing is not finished.

Finally, the ECU 3 proceeds to Step S217, and then erroneous recognition determination processing for one detection cycle by the detection unit 22 of the camera 2 is finished, and the ECU 3 returns to Step S202. Then, the ECU 3 waits at Step S202 until reception of next detection information from the camera 2. This concludes the description of the series of processing steps of FIG. 3.

Next, a description is given of the technical significance of the second embodiment of the present invention involving such a series of processing steps illustrated in FIG. 3. Also in the second embodiment, similarly to the case of the first embodiment, it is possible to reliably determine erroneous recognition even when an object that should not have been detected in actuality is output from the detection unit 22 of the camera 2 as an obstacle.

At this time, the values of the determination value Thresh1 and the determination value Thresh2 can be appropriately changed by, for example, being increased in proportion to the value of the update count k from initial update depending on the value of the update count k. Then, similarly to the first embodiment, the determination unit 31 in the second embodiment can use the determination value Thresh1 and the determination value Thresh2, which have been changed to appropriate values, to determine validity of the detection result.

As a result, it is possible to appropriately determine that a detection result of erroneous recognition, which has been output from the detection unit 22 as a value having an accidentally large reliability value but having a small reliability $Q_{i,k}$ in actuality in one of less than N detection results from initial detection, is erroneous recognition based on the result of a plurality of times of addition.

As another method of determining erroneous recognition, a method of determining erroneous recognition based on the count of continuous detection is conceivable. However, in the case of this method, an object is required to be continuously detected a plurality of times for determination of normal recognition. Thus, even when the reliability $Q_{i,k}$ is large, there occurs a time delay until determination of normal recognition.

Meanwhile, adoption of the technique in the second embodiment has an advantage in that, when the reliability $Q_{i,k}$ is sufficiently large or the reliability $Q_{i,k}$ is extremely small, the ECU 3 can determine whether the recognition is normal or erroneous with a small time delay.

Third Embodiment

In the first embodiment, a description has been given of the configuration and processing for determining erroneous recognition in the case where the detection count of an obstacle is equal to or larger than the count N determined in advance. Further, in the second embodiment, a description has been given of the configuration and processing for determining erroneous recognition in the case where the detection count of an obstacle from initial detection is smaller than the count N.

Meanwhile, in a third embodiment of the present invention, a description is given of a configuration and processing for determining erroneous recognition in a case where detection of an obstacle does not depend on the detection count from initial detection. In other words, in the third embodiment, a description is given of a case where the object detection device includes the processing functions of the first embodiment and the second embodiment.

Figure 4:
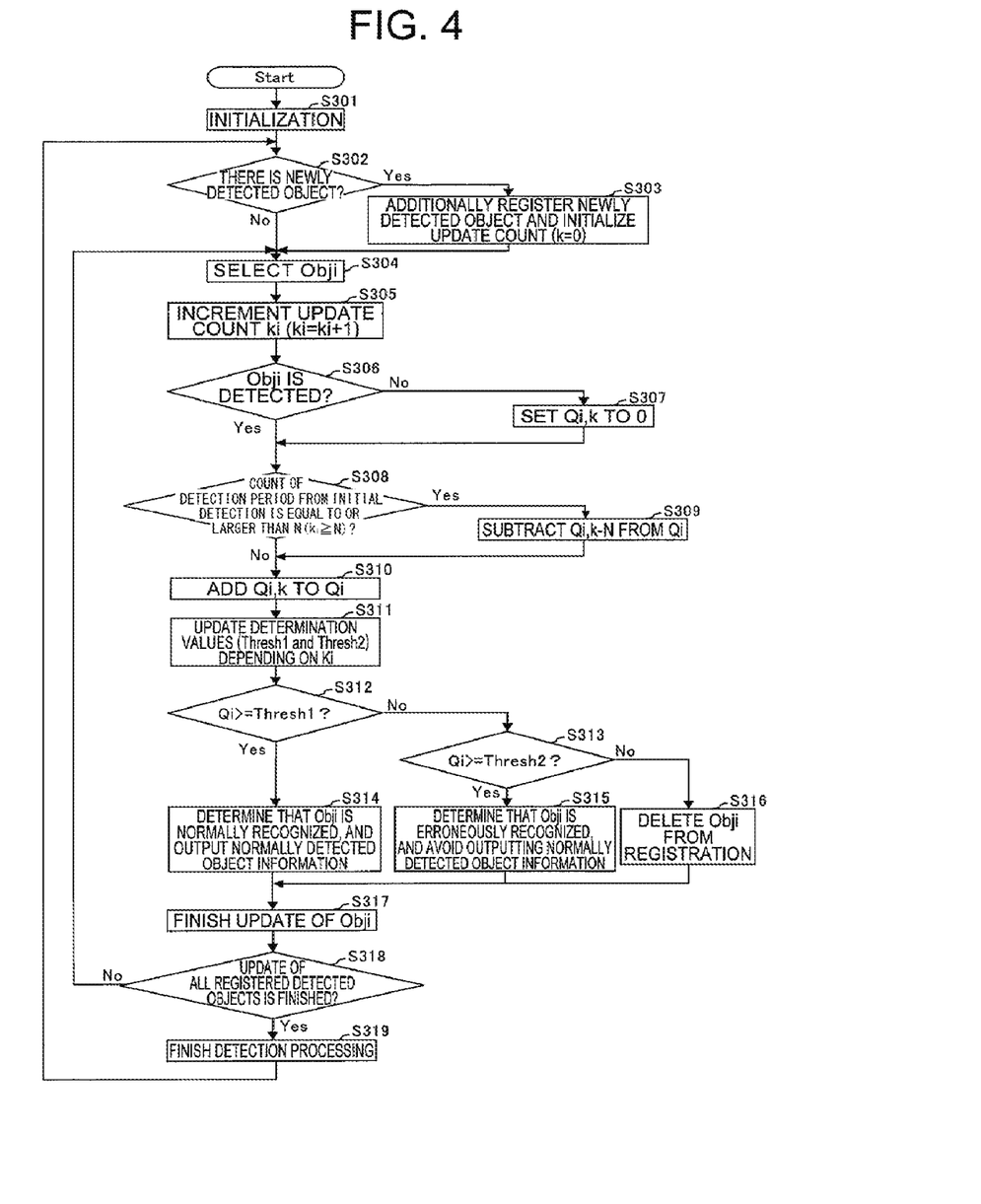
FIG. 4 is a flowchart for illustrating a series of processing steps to be executed by the object detection device according to the third embodiment of the present invention.

The block diagram is the same as that of FIG. 1. Further, FIG. 4 is a flowchart for illustrating a series of processing steps to be executed by an object detection device according to the third embodiment of the present invention. Thus, in the following, the description of the block diagram of FIG. 1 is omitted, and FIG. 4 is used to describe the processing of the third embodiment in detail.

<Description of Flowchart>

Now, a description is given in detail of the flowchart of FIG. 4. Each reference symbol used in FIG. 4 and the following description represents the same meaning as those in the first and second embodiments.

First, in Step S301, the ECU 3 performs initial processing determined in advance. After that, in Step S302, the ECU 3 receives detection information, which has been obtained from the image, from the camera 2, and determines whether there is a newly detected object.

That is, the ECU 3 determines whether an object matching the detection information acquired from the camera 2 is a detected object stored in the RAM. When it is determined that there is a newly detected object (Step S302: Yes), the processing proceeds to Step S303, whereas when it determined that there is no newly detected object (Step S302: No), the processing proceeds to Step S304.

When the ECU 3 proceeds to Step S303, the ECU 3 registers information on a newly detected object $Obj_{new}$ in the RAM, and performs initialization by setting an update count $k_{new}$ to $k_{new}=0$, and a reliability $Q_{new}$ to $Q_{new}=0$. After that, the ECU 3 proceeds to Step S304.

In Step S304 to Step S317, the ECU 3 selects one object from among detected objects registered in the RAM, and performs processing of determining erroneous recognition.

In Step S304, the ECU 3 selects one detected object for which update processing is not performed from among the detected objects registered in the RAM. The ECU 3 sets this object as $Obj_i$. After that, the ECU 3 proceeds to Step S305.

Next, in Step S305, the ECU 3 increments ($k_i=k_i+1$) the value of $k_i$ representing a detection update count from initial detection for the selected object $Obj_i$, and proceeds to Step S306.

Next, in Step S306, the ECU 3 determines whether the detected object corresponding to $Obj_i$ is contained in the detection information received from the detection unit 22 of the camera 2. When it is determined that the detected object corresponding to $Obj_i$ is contained in the detection information (Step S306: Yes), the ECU 3 proceeds to Step S308, whereas when it is determined that the detected object corresponding to $Obj_i$ is not contained in the detection information (Step S306: No), the ECU 3 proceeds to Step S307.

After the ECU 3 proceeds to Step S307, the ECU 3 sets the reliability $Q_{i,k}$ of $Obj_i$ at the $k_i$-th update to 0, and proceeds to Step S308.

In Step S308, the ECU 3 determines whether the update count from initial detection of $Obj_i$ is equal to or larger than the count N determined in advance. When $_i$>=N is satisfied (Step S308: Yes), the update count is equal to or larger than the count N, and thus the processing proceeds to Step S309. Otherwise, the update count is smaller than the count N (Step S309: No), and the processing proceeds to Step S310.

When the ECU 3 proceeds to Step S309, in order to calculate the sum of latest N reliabilities, the ECU 3 subtracts, from $Q_i$ representing the reliability of $Obj_i$, the ($k_i$-N)-th reliability of $Obj_i$, namely, $Q_{i,k_i-N}$ being the oldest reliability among current N reliabilities.

Next, in Step S310, the ECU 3 adds the $k_i$-th reliability of $Obj_i$ to the value of the reliability $Q_i$ before update, calculates the sum of N reliabilities of from the ($k_i$-N+1)-th reliability to the current $k_i$-th reliability, and proceeds to Step S311.

With the processing of Step S308, Step S309, and Step S310, when the update count is equal to or larger than the count N from initial detection, $Q_i$ representing the reliability of $Obj_i$ can be calculated as the sum of latest N reliabilities of $Obj_i$. On the contrary, when the update count is smaller than the count N, the accumulated value of from the first to $k_i$-th reliabilities can be calculated as the reliability $Q_i$ of the $Obj_i$.

Next, in Step S311, the ECU 3 updates a determination value Thresh1 and a determination value Thresh2 in accordance with the update count $k_i$ from initial detection of $Obj_i$, and proceeds to Step S312.

Next, in Step S312, the ECU 3 compares the reliability $Q_i$ of $Obj_i$ with the determination value Thresh1 to determine whether $k_i$-th detection is normal. When $Q_i$>=Thresh1 is determined (Step S312: Yes), the ECU 3 proceeds to Step S314. On the contrary, when $Q_i$<Thresh1 is determined (Step S312: No), the ECU proceeds to Step S313.

When the ECU 3 proceeds to Step S313, the ECU 3 compares the reliability $Q_i$ of $Obj_i$ with the determination value Thresh2 to determine whether to maintain registration of or delete $Obj_i$ registered in the RAM. When $Q_i>=$Thresh2 is determined (Step S313: Yes), the ECU 3 proceeds to Step S315. On the contrary, when $Q_i<$Thresh2 is determined (Step S313: No), the ECU 3 proceeds to Step S316.

When the ECU 3 proceeds to Step S314, it is determined that the reliability is sufficiently high. Thus, the ECU 3 determines that $Obj_i$ is normally detected, outputs this determination as the normally detected object information, and proceeds to Step S317.

When the ECU 3 proceeds to Step S315, it is determined that the reliability is not sufficiently high. Thus, the ECU 3 does not output the normally detected object information. However, the ECU 3 does not delete $Obj_i$ from detection registration information, and maintains the information in the RAM. After that, the ECU 3 proceeds to Step S317.

When the ECU 3 proceeds to Step S316, it is determined that the reliability is extremely low. Thus, the ECU 3 does not output the normally detected object information. Further, the ECU 3 deletes $Obj_i$ from the RAM to delete the registration. After that, the ECU 3 proceeds to Step S317.

Then, in Step S317, the ECU 3 sets a flag indicating completion of the processing of updating $Obj_i$, and proceeds to Step S318.

Next, in Step S318, the ECU 3 determines whether the processing of updating all the detected objects registered in the RAM is finished. When it is determined that the processing of updating all the detected objects is finished (Step S318: Yes), the ECU 3 proceeds to Step S319.

On the contrary, when it is determined that there is a detected object for which the updating processing is not finished (Step S318: No), the ECU 3 returns to Step S304, and the ECU 3 performs processing similar to the processing of from Step S304 for the detected object for which the updating processing is not finished.

Finally, the ECU 3 proceeds to Step S319, and then erroneous recognition determination processing for one detection cycle by the detection unit 22 of the camera 2 is finished, and the ECU 3 returns to Step S302. Then, the ECU 3 waits at Step S302 until reception of next detection information from the camera 2. This concludes the description of the procedures of processing of FIG. 4.

Next, a description is given of the technical significance of the third embodiment of the present invention involving such a series of processing steps illustrated in FIG. 4. The series of processing steps illustrated in FIG. 4 have the processing function of each of FIG. 2 in the first embodiment and FIG. 3 in the second embodiment. Therefore, it is possible to accurately determine erroneous recognition without depending on the detection count from initial detection.

The first to third embodiments described above may be appropriately changed within the range of gist described in this disclosure. For example, in the first to third embodiments, the camera is used as the configuration of detecting an obstacle around the vehicle. However, the configuration is not limited to the camera. A device other than the camera can be used as long as the device has a sensor function capable of detecting an obstacle around the vehicle.

Further, in the first to third embodiments, the ECU 3 executes the processing of determining presence of an obstacle by using a detection result. However, a configuration of executing this determination processing on the CPU executing image recognition processing on the image acquired by the camera 2 can also be adopted.

Further, in the first to third embodiments described above, an object serving as a detection target is referred to as "obstacle". However, the object is not limited to the obstacle. For example, it is also possible to determine erroneous recognition by setting a target object, an object that may be touched, and other objects as the detection target.

Further, in the first to third embodiments described above, a description has been given of the object detection device and object detection method for detecting an object by the automatic driving vehicle as a specific example. However, the present invention is not necessarily required to be applied to the vehicle. The present invention can be applied to a device for detecting an object in order to prevent erroneous detection.

REFERENCE SIGNS LIST

1 object detection device, 2 camera, 3 ECU, 21 image pickup unit, 22 detection unit, 31 determination unit, 32 control unit.

The invention claimed is:
1. An object detection device, comprising:
a detection unit configured to detect one or more objects for every detection period to output detection information containing a reliability for each of the detected one or more objects;
a determination unit configured to:
increment a detection count for each of the one or more objects;
calculate, for each of the one or more objects, a sum of latest N reliabilities in the detection period, which are contained in the detection information; and
determine, as a normally recognized object, an object for which the sum is equal to or larger than a first threshold value, which is set in advance depending on the detection count; and
a control unit configured to output, as normally detected object information, detection information on an object determined to be the normally recognized object by the determination unit among objects contained in the detection information.

2. The object detection device according to claim 1, wherein the determination unit is configured to, when the detection count from initial detection is M, which is smaller than N:
increment the detection count for each of the one or more objects;
calculate, for each of the one or more objects, a sum of M reliabilities from the initial detection, which are contained in the detection information; and
determine, as a normally recognized object, an object for which the sum is equal to or larger than a first threshold value, which is set in advance depending on the detection count.

3. The object detection device according to claim 1, wherein the determination unit is configured to:
determine, as an erroneously recognized object, an object for which the sum is smaller than a second threshold value, which is set in advance depending on the detection count to be smaller than the first threshold value; and
delete information on the determined object from the detection information.

4. The object detection device according to claim 2, wherein the determination unit is configured to:

determine, as an erroneously recognized object, an object for which the sum is smaller than a second threshold value, which is set in advance depending on the detection count to be smaller than the first threshold value; and delete information on the determined object from the detection information.

5. An object detection method, comprising:

a first step of acquiring detection information containing a reliability for each object serving as a detection target for every detection period via a detector configured to output the detection information;

a second step of:
incrementing a detection count for each object;
calculating, for each object, a sum of latest N reliabilities in the detection period, which are contained in the detection information; and
determining, as a normally recognized object, an object for which the sum is equal to or larger than a first threshold value, which is set in advance depending on the detection count; and a third step of outputting, as normally detected object information, detection information on an object determined to be the normally recognized object in the first step among objects contained in the detection information.

6. The object detection method according to claim 5, wherein the second step further includes, when the detection count from initial detection is M, which is smaller than N:

incrementing the detection count for each object;
calculating, for each object, a sum of M reliabilities from the initial detection, which are contained in the detection information; and
determining, as a normally recognized object, an object for which the sum is equal to or larger than a first threshold value, which is set in advance depending on the detection count.

7. The object detection method according to claim 5, wherein the second step further includes:

determining, as an erroneously recognized object, an object for which the sum is smaller than a second threshold value, which is set in advance depending on the detection count to be smaller than the first threshold value; and deleting information on the determined object from the detection information.

8. The object detection method according to claim 6, wherein the second step further includes:

determining, as an erroneously recognized object, an object for which the sum is smaller than a second threshold value, which is set in advance depending on the detection count to be smaller than the first threshold value; and deleting information on the determined object from the detection information.

\* \* \* \* \*